(12) United States Patent
Morris et al.

(10) Patent No.: US 7,921,134 B2
(45) Date of Patent: Apr. 5, 2011

(54) METHOD AND APPARATUS FOR CREATING DATA CAROUSELS

(75) Inventors: Kirsty Morris, Peterborough (GB); Mark Dobie, Southampton (GB)

(73) Assignee: Sony United Kimgdom Limited, Weybridge (GB)

( * ) Notice: Subject to any disclaimer, the term of this patent is extended or adjusted under 35 U.S.C. 154(b) by 0 days.

(21) Appl. No.: 10/323,071

(22) Filed: Dec. 19, 2002

(65) Prior Publication Data
US 2003/0154203 A1    Aug. 14, 2003

(30) Foreign Application Priority Data
Dec. 20, 2001    (GB) .................................. 0130495.5

(51) Int. Cl.
*G06F 7/00*    (2006.01)
*G06F 17/30*    (2006.01)

(52) U.S. Cl. ........ 707/802; 707/631; 725/105; 725/135; 725/143

(58) Field of Classification Search ............ 707/1–104.1; 348/552, 734; 725/46, 61, 135, 140, 82, 725/120, 112, 109
See application file for complete search history.

(56) References Cited

U.S. PATENT DOCUMENTS

| | | | |
|---|---|---|---|
| 6,317,885 B1 * | 11/2001 | Fries ............................... | 725/109 |
| 6,405,239 B1 * | 6/2002 | Addington et al. ........... | 709/203 |
| 6,427,150 B1 * | 7/2002 | Oashi et al. ...................... | 707/10 |
| 6,622,004 B1 * | 9/2003 | Sonoda et al. ................ | 455/3.05 |
| 6,675,385 B1 * | 1/2004 | Wang ............................... | 725/39 |
| 6,708,338 B1 * | 3/2004 | Kim ................................ | 725/135 |
| 6,782,006 B1 * | 8/2004 | Tanaka et al. .................. | 370/468 |
| 6,792,577 B1 * | 9/2004 | Kimoto ......................... | 715/235 |
| 6,819,344 B2 * | 11/2004 | Robbins ......................... | 715/848 |
| 6,826,597 B1 * | 11/2004 | Lonnroth et al. ............. | 709/207 |
| 6,871,002 B1 * | 3/2005 | Saito ................................ | 386/46 |
| 6,886,178 B1 * | 4/2005 | Mao et al. ........................ | 725/52 |
| 6,931,198 B1 * | 8/2005 | Hamada et al. ................. | 386/46 |
| 6,943,845 B2 * | 9/2005 | Mizutome et al. ............. | 348/555 |
| 6,970,641 B1 * | 11/2005 | Pierre et al. ...................... | 386/83 |
| 6,983,482 B2 * | 1/2006 | Morita et al. ................... | 725/32 |
| 7,017,175 B2 * | 3/2006 | Alao et al. ..................... | 725/105 |
| 7,020,839 B1 * | 3/2006 | Hosoda ......................... | 715/523 |
| 7,035,295 B2 * | 4/2006 | Belleguie ..................... | 370/537 |

(Continued)

FOREIGN PATENT DOCUMENTS
BE    1107600 A1 *    6/2001

(Continued)

OTHER PUBLICATIONS

McParland, A. et al. MYTV: A Practical Implementation of TV-Anytime on DVB and The Internet. IBC 2001 Conference (Sep. 2001).*

(Continued)

*Primary Examiner* — Usmaan Saeed
(74) *Attorney, Agent, or Firm* — Oblon, Spivak, McClelland, Maier & Neustadt, L.L.P.

(57) ABSTRACT

A method and apparatus for creating data carousels including representing an object carousel in XML according to a predefined XML schema, analyzing the XML representation of the object carousel with regard to technical standards for data carousels and broadcast systems, creating a representation of a data carousel in XML according to a predefined XML schema and based on the step of analyzing and providing data to a carousel according to the XML representation of the data carousel.

16 Claims, 6 Drawing Sheets

U.S. PATENT DOCUMENTS

| | | | |
|---|---|---|---|
| 7,143,347 B2* | 11/2006 | Su | 715/208 |
| 7,240,103 B2* | 7/2007 | Jerding et al. | 709/220 |
| 7,249,137 B1* | 7/2007 | Shikatani | 707/102 |
| 7,284,239 B1* | 10/2007 | Young et al. | 717/137 |
| 7,380,206 B1* | 5/2008 | Usuda | 715/236 |
| 7,657,917 B2* | 2/2010 | Fries et al. | 725/117 |
| 2001/0032241 A1* | 10/2001 | Braga Illa et al. | 709/204 |
| 2001/0037507 A1* | 11/2001 | Mori | 725/97 |
| 2001/0056460 A1* | 12/2001 | Sahota et al. | 709/201 |
| 2002/0059645 A1* | 5/2002 | Soepenberg et al. | 725/137 |
| 2002/0060748 A1* | 5/2002 | Aratani et al. | 348/552 |
| 2002/0062287 A1* | 5/2002 | Katz et al. | 705/51 |
| 2002/0108115 A1* | 8/2002 | Palmer | 725/50 |
| 2002/0120790 A1* | 8/2002 | Schwalb | 709/328 |
| 2002/0199187 A1* | 12/2002 | Gissin et al. | 725/32 |
| 2003/0005444 A1* | 1/2003 | Crinon et al. | 725/50 |
| 2003/0009763 A1* | 1/2003 | Crinon et al. | 725/92 |
| 2003/0023970 A1* | 1/2003 | Panabaker | 725/32 |
| 2003/0033607 A1* | 2/2003 | Schwalb | 725/112 |
| 2003/0084449 A1* | 5/2003 | Chane et al. | 725/46 |
| 2003/0191815 A1* | 10/2003 | Skaringer et al. | 709/219 |
| 2004/0049790 A1* | 3/2004 | Russ et al. | 725/82 |
| 2005/0172310 A1* | 8/2005 | Kwon | 725/9 |
| 2006/0041924 A1* | 2/2006 | Bushmitch et al. | 725/132 |
| 2008/0072274 A1* | 3/2008 | Oh et al. | 725/136 |

FOREIGN PATENT DOCUMENTS

| | | |
|---|---|---|
| EP | 1 022 901 | 7/2000 |
| EP | 1 126 707 | 8/2001 |
| EP | 1 134 918 | 9/2001 |
| GB | 2 357 922 | 7/2001 |
| IT | 1148432 A2 * | 10/2001 |
| WO | WO 01 33852 | 5/2001 |
| WO | WO 01/98948 A2 * | 12/2001 |

OTHER PUBLICATIONS

TS Builder 2.50 A broadcast and development tool for the creation of MHP and MHEG transport streams. Unisoft.com. Aug. 2001.*

Ogawa, et al. Template-based, Format-extendible Authoring for BS Digital Data Broadcast Service. IEEE Jan. 8-12, 2001.*

Dinusha Ileperuma et al. MPEG7 for Integrated Access to Broadcast and Internet Data. SAMBITS system for IST-1999.*

Neel Sundaresan et al. Algorithms and Programming Models for Efficient Representation of XML for Internet Applications. WWW10, May 2-5, 2001. Pub. in ACM.*

Studio System for Creation, Visualisation & Transmission of Integrated Broadcast and Internet Content Using DVB. John Cosmas et al. PGNET 2001.*

Yongsuk Kim et al. Interactive Broadcast Terminal System Using MPEG-2 and MPEG-4. ISCAS 2000-IEEE Symposium on circuits and Systems May 28-31, 2000.*

Jean-Pierre Evain. TV-Anytime. Metadata. A preliminary specification on schedule! Sep. 2000.*

Jin-young Yang et al. A Design of a Streaming System for Interactive Television Broadcast. IEEE 2000.*

Various Authors including John Cosmas et al. IST Project 1999. SAMBIT-Deliverable 3. Actual Delivery date Nov. 15, 2000. IST-1999-12605.*

John-Michael Feist. Interactive Information service using digital platform MHP. A doctorat paper. Presented Mar. 15, 2001.*

Regis J. Crinon. ThE DSM-CC Object Carousel For Broadcast Data Services. Sharp Laboratories. IEEE 1997.*

Information technology -Generic coding of moving pictures and associated audio information—Part 6: Extensions for DSM-CC. International Standard ISO/IEC 13818-6. Sep. 1, 1998.*

A Multimedia Future for DAB? P A O Gardiner. British Broadcasting Corporation, UK. IBC 1998.*

"TV-Anytime Metadata: A Preliminary Specification On Schedule!" By Jean-Pierre Evain. In EBU Technical Review No. 284 (Sep. 2000). ISSN: 1609-1469.*

MPEG-7 tackles multimedia content. By Neil Day. EE Times. (Nov. 12, 2001 11:52 AM EST).*

Nick Birch: "Building MHP Carousels" Strategy and Technology Ltd, 'Online!—Oct. 2000 pp. 1-23, XP002242918 Retrieved from the Internet: <URL:http://www.irt.de/IRT/publikationen/mhp/docs/s-and-t_dotcom_slides.pdf> 'retrieved on Apr. 4, 2004!

Ladebusch U: "Einfuehrung in Den DVB-Datenrundfunk", Fernseh und Kinotechnik, VDE Verlag GMBH. Berlin, DE, vol. 52, NR. 7, pp. 425-432 XP000870644.

Balabanian V et al: "An Introduction to Digital Storage Media—Command and Control", IEEE Communications Magazine, IEEE Service Center. Piscataway, N.J, US, vol. 34, NR. 11, pp. 122-127 XP000636135.

Fernseh- und Kino- Technik, Jul. 1998, Huthig, Germany, pp. 425-432. Introduction to digital video broadcasting (DVB) data broadcasting II. Ladebusch, U.

* cited by examiner

METHOD AND APPARATUS FOR CREATING DATA CAROUSELS

BACKGROUND OF THE INVENTION

1. Field of the Invention

The present invention relates to a method and apparatus for creating data carousels, in particular providing a user who has a particular file structure in mind with an easy mechanism by which to create and optimise appropriate data carousels.

2. Description of the Related Art

A data carousel may be created by developing new data or editing existing data.

For instance as part of a DVB compliant system, it is known to provide an information server for broadcasting any form of data, such as MHEG5 applications, HTML pages, Java applications, IRD software upgrades and other data services in the form of DSMCC objects on data carousels. An IRD is an Integrated Receiver Decoder and this term is used in standards documents to describe devices capable of receiving and decoding digital streams, eg. set top boxes and integrated digital TV sets.

Raw data may be divided into appropriate DSI (Download Server Initiate), DII (Download Information Indication) or DDB (Download Data Block) sections for insertion into MPEG transport stream packets as a data carousel. These are three types of messages defined in DSM-CC that carry the structure of a data carousel in the broadcast stream. In fact, DSI, DII and DDB are "messages" but "DSI section" is used to describe a MPEG section carrying a DSI message. Sections are split into packets, the lowest level structure in the stream. A data carousel is the collection of DSI, DII and DDB messages.

Alternatively, however, a user may determine a desired file structure for an object carousel consisting of files, directories and other object types. In DSM-CC there are five object types in an object carousel, namely Files, Directories, a Service Gateway, Streams and StreamEvents. These can all exist in the hierarchical structure that is like a filesystem. It is then a non trivial matter to rearrange the data of the object carousel into DSI, DII and DDB sections in an optimised manner for broadcast as a data carousel. There are many possible data carousel structures that can represent a given object carousel. It is desirable to choose an optimal data carousel that will be most effective by using knowledge of the intended use for the files in the object carousel and knowledge of the receiving equipment, but some experimentation is required to achieve this optimisation. Each time the user wishes to make alterations to the file structure on which the object carousel is based, it is necessary to reconsider entirely the structure of the corresponding data carousel.

OBJECTS OF THE INVENTION

It is an object of the present invention to provide a method and apparatus by which a user can easily create data carousels corresponding to desired file structures or object carousels. Furthermore, it is an object to provide a system whereby a user may more easily optimise data for use with a data carousel.

SUMMARY OF THE INVENTION

According to the present invention, there is provided a method of creating data carousels including representing an object carousel in a structured data format, analysing the structured data format representation of the object carousel for compatibility with at least one predetermined technical standard, creating a representation of a data carousel in the structured data format based on the step of analysing and providing output data to a carousel according to the structured data format representation of the data carousel.

According to the present invention, there is also provided an apparatus for creating data carousels, including a memory containing a data format definition for representing object carousels in a structured data format, a memory containing a data format definition for representing data carousels in the structured data format, a GUI by which a user may create a representation of an object carousel in the structured data format, a processor for analysing the structured data format representation of the object carousel for compatibility with at least one predetermined technical standard and for creating, on the basis of the analysis, a representation in the structured data format of a data carousel according to the data format definition for the structured data format representing data carousels.

In this way, by defining the required object carousel as a structured data format representation, it is possible to provide a predetermined algorithm in any appropriate processing language to automatically form a structured data format representation of an equivalent data carousel. Furthermore, compared to previous binary representations of the data carousel, the structured data format representation allows a user relatively easily to understand the structure of the data carousel. This allows the user to edit the resulting data carousel and to optimise it with regard to its use in providing an output byte stream suitable for broadcast.

In order to allow conversion from the object carousel structured data format representation to the data carousel structured data format representation, the two structured data format representations should follow predetermined formats. Hence, respective data format definitions may be defined for the structured data format representing object carousels and the structured data format representing data carousels.

Once provided with the data format definition for the structured data format representing object carousels, a user may construct a desired data structure in the structured data format for the object carousel. This may then be converted automatically to structured data conforming to the data format definition for the structured data format representing data carousels. With the data format definition for structured data representing data carousels, the user may then edit the structured data representation of the data carousel so as to optimise it.

In this respect, the apparatus may be provided with a GUI allowing a user to edit the structured data format representation of the data carousel so as to optimise the arrangement of the data for use as part of a carousel.

Having prepared an appropriate data carousel with the structured data format representation, an output stream may be provided to a carousel. Hence, the apparatus preferably includes an output processor for providing data to a carousel according to the structured data format representation of the data carousel.

It will be understood that the data carousel represented by the structured data format representation must conform to the appropriate technical standards for the system in which the data carousel is to be broadcast.

The specific examples described below are based on several standards documents published by various international organisations.

ISO publish the MPEG-2 family of standards of which part 1 (Systems) defines transport streams, packets, sections and multiplexing and part 6 (DSM-CC) defines underlying object and data carousel structures.

There are other standards which govern individual digital TV systems such as MHEG-5 (published by ISO) and MHP (published by DVB). They mainly define how the receiving equipment operates but they also refer to the MPEG standards and define further refinements and constraints on the stream structures that are generated.

Hence, the technical standards include appropriate standards for carousels and broadcast systems. Preferably, they include DSM-CC standards and relevant standards for broadcast systems.

Preferably, the structured data format is XML such that the data format definitions are XML schemas.

As mentioned above, conversion from the XML representation of the object carousel to the XML representation of the data carousel can be conducted in any appropriate manner as a data transformation. However, it is particularly advantageous to use an XSLT algorithm to carry out this conversion, since this is particularly well suited. The XSLT language allows convenient interpretation and manipulation of data in XML format.

It should be noted that converting the XML representation of the object carousel with an XSLT algorithm is not straightforward, since the XSLT algorithm will require knowledge of the sizes of the files of the object carousel in order to create the appropriate XML representation of the data carousel. Hence, preferably, the sizes of the files of the object carousel are determined and provided in XML as a look-up table such that the XSLT algorithm uses the look up table when creating the XML representation of the data carousel.

It will be appreciated that the present invention and its preferred features as described above can be embodied as a computer program or code components stored on a computer readable storage medium.

BRIEF DESCRIPTION OF THE DRAWINGS

FIG. 1 illustrates a broadcasting system, such as a DVB system, in which an information server is incorporated for providing various types of data file on a carousel.

DETAILED DESCRIPTION OF THE PREFERRED EMBODIMENTS

Figure 1:
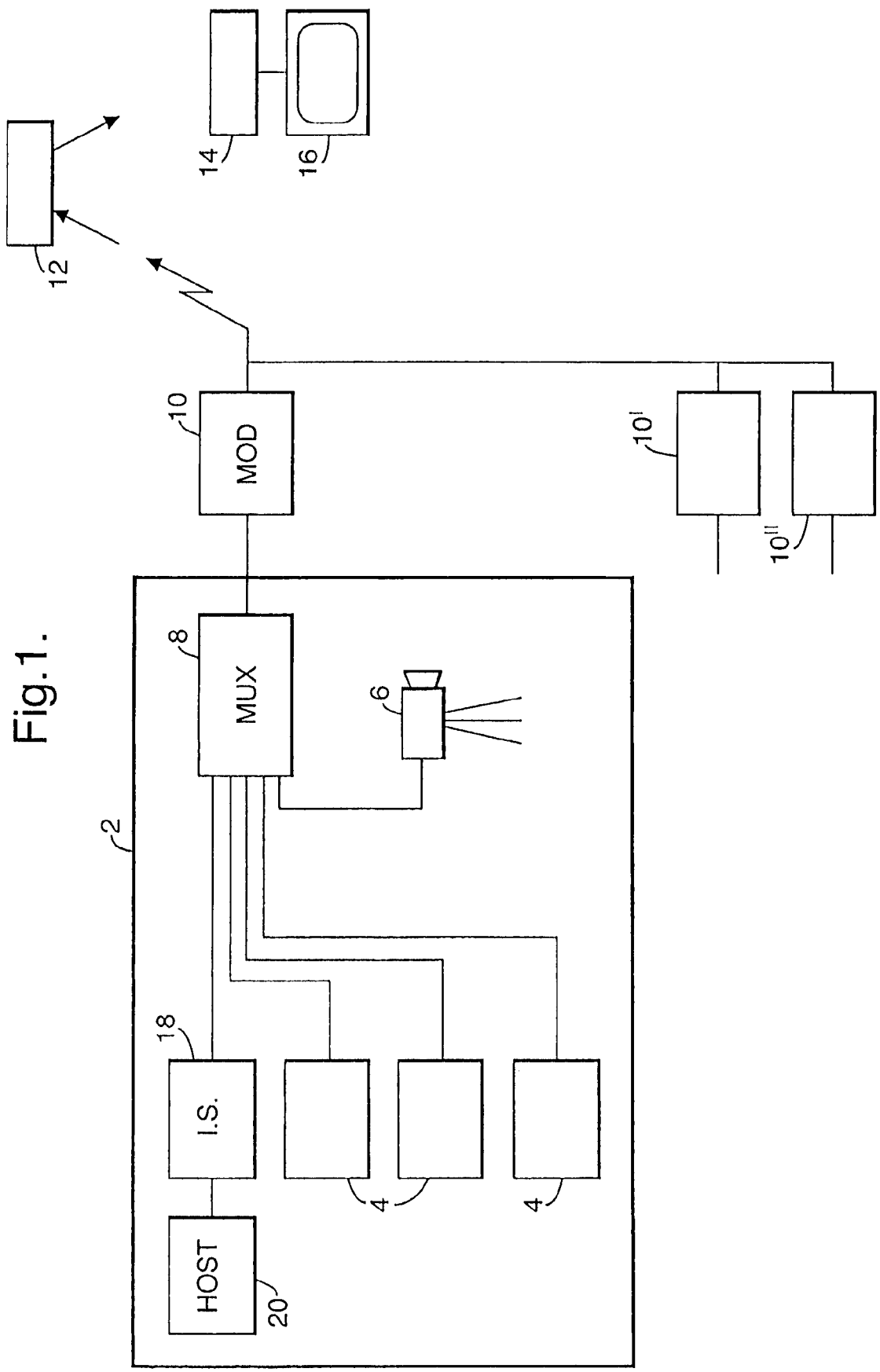
FIG. 1 illustrates a generalized broadcast system.

The invention will be more clearly understood from the following description, given by way of example only, with reference to the accompanying drawings.

A play-out section 2 incorporates a number of video/audio sources 4 as well as live sources 6. Data from these sources, for instance in the form of MPEG-2 transport stream packets, is fed to a multiplexer 8 and output from the play-out section 2. The multiplexed stream of data is fed to a modulator 10 for transmission, in this example, from a satellite 12. The signal is then received by an IRD such as set top box 14 of television 16. Signals from a number of other modulators 10', 10", etc may be fed together and transmitted to the satellite 12.

In this system, it is also possible to provide an information server 18. Just like the video/audio sources 4,6, the information server 18 provides data, for instance in the form of MPEG transport stream packets to the multiplexer 8 for insertion into the data stream for transmission. The information server may be used to broadcast any form of data, but, in particular, MHEG5 applications, HTML pages, Java applications, IRD software upgrades and other data services in the form of DSM-CC objects on data carousels.

The information server may be controlled by a host computer 20.

The arrangement of data on object or data carousels is well known in the art and, indeed, has to conform to certain standards, according to the systems in question.

Figure 2:
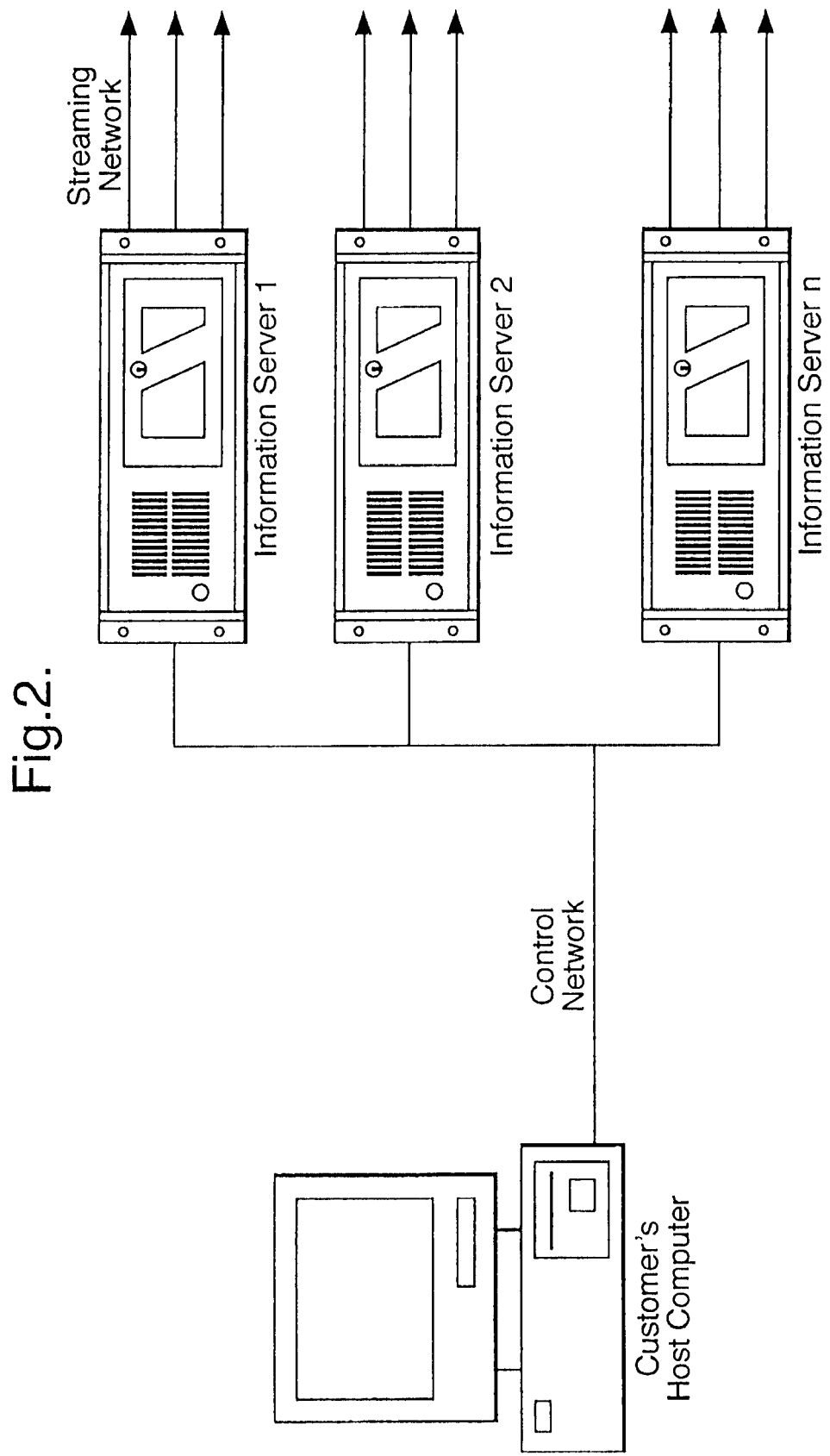
FIG. 2 illustrates information servers for producing data carousels.

FIG. 2 illustrates how one host computer may be used to control any number of information servers, each producing a number of streams.

Figure 3:
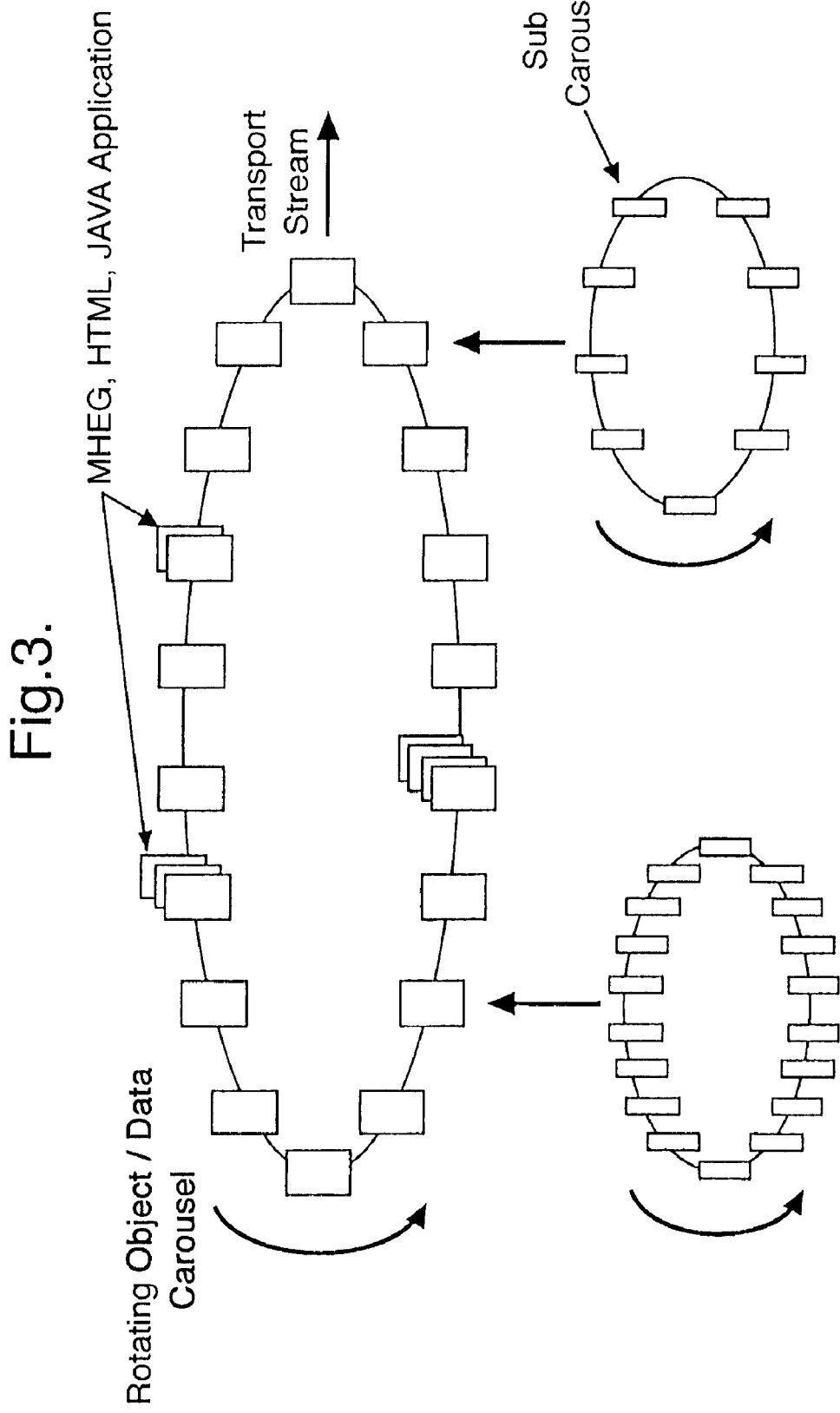
FIG. 3 illustrates schematically object/data carousel.

The host, together with an information server constructs a carousel of information, for instance as illustrated in FIG. 3. Transport stream data is constructed appropriately for transmitting in rotation a series of files, directories and other objects. For instance, each page as illustrated in FIG. 3 might comprise MHEG or HTML files or Java applications. As a result, the stream produced includes each of those pages in turn.

As illustrated, it is also possible to construct sub carousels, such that on each rotation of the main carousel of pages, a particular page itself rotates through a series of sub pages.

As is well known, the output stream is arranged in a predetermined manner. For instance, for DSM-CC, appropriate DSI, DII or DDB sections are arranged and assembled in MPEG transport stream packets.

Figure 4:
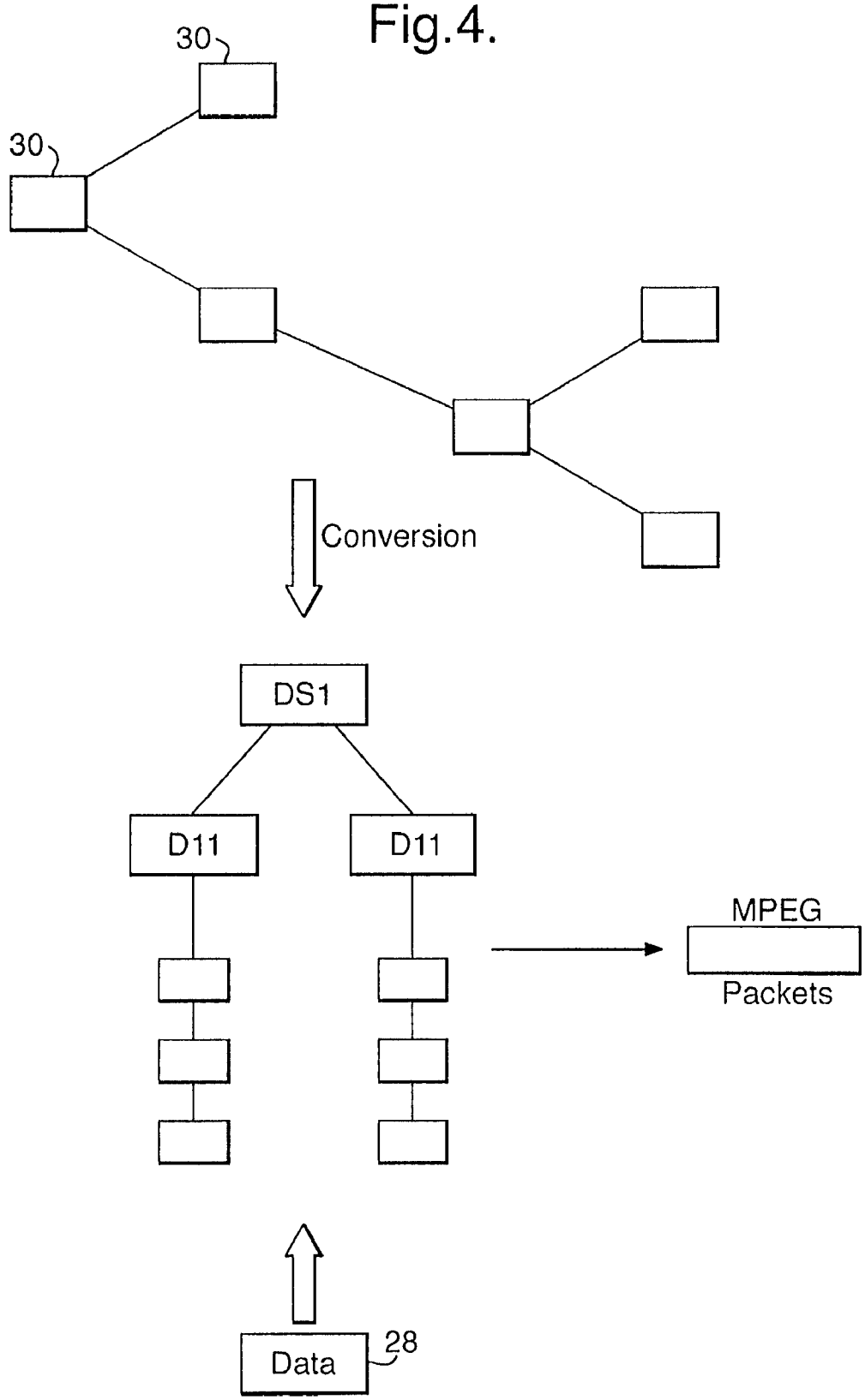
FIG. 4 illustrates schematically a file structure in relation to a data carousel structure.

As illustrated schematically in FIG. 4, the DSI/DII/DDB sections may be constructed using raw data 28. Often, however, a user prepares files 30 and determines a required file structure for an object carousel. This must then be converted to the appropriate DSI/DII/DDB sections.

Conversion of the various files 30 and their linked inter relations into the appropriate sections is a non trivial process. It is particularly difficult to provide sections in an optimised manner for broadcast and for efficient use by the receiving equipment. A large part of the optimisation process is delivering the data in a way that the receiving equipment can load it quickly from the stream in the order that it needs.

Figure 5:
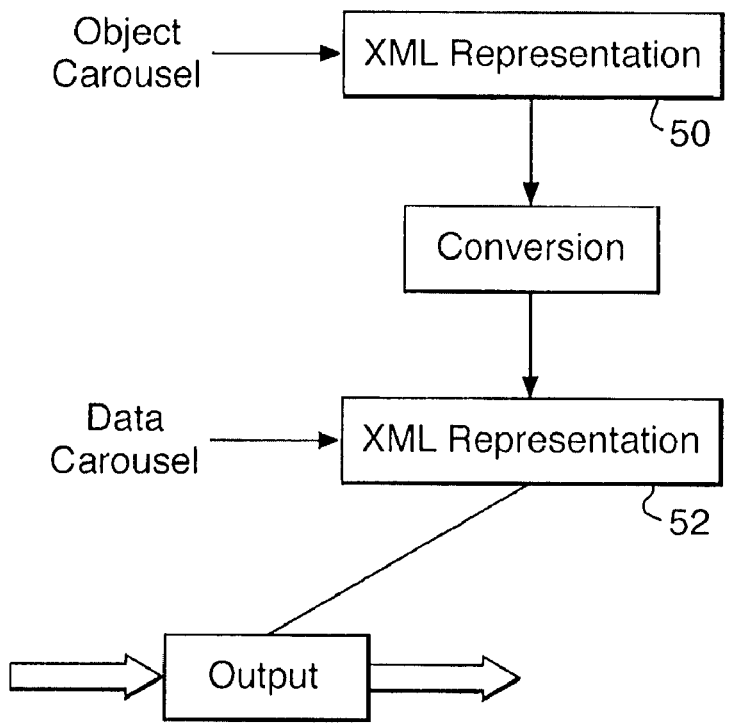
FIG. 5 illustrates schematically conversion from object to data carousels.
Figure 6:
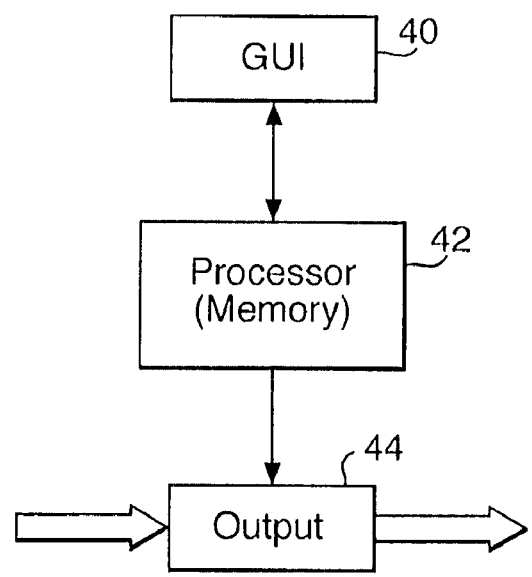
FIG. 6 illustrates schematically an apparatus for embodying the present invention.

As illustrated in FIG. 5, it is proposed that the file structure of the object carousel should be created as an XML representation. XML stands for Extensible Mark-up Language and is a general purpose language that can be used to represent any type of structured information. As illustrated in FIG. 6, a GUI (Graphical User Interface) 40 interacts with a processor 42, for instance including a memory, to enable a user to create the desired object carousel and XML representation 50. Once the desired object carousel has been created as the XML representation 50, the processor 42 then conducts a predetermined conversion so as to produce an XML representation 52 of an equivalent data carousel. At this point, the processor 42 may be used to control an output processor 44 to create the required data stream on the basis of the data carousel defined by the XML representation. In particular, the output processor 44 derives the required raw data, for instance from some storage means and arranges this into appropriate sections as defined by the XML representation of the data carousel.

In this way, a user easily achieves an appropriate data carousel according to his/her requirements as defined for the object carousel. Furthermore, the XML representation of the data carousel may be relatively easily understood by the user, particularly as compared to bit/byte representations of data carousels. By means of the GUI 40, the user is then able to modify the generated data carousel as required by modifying the XML representation 52. In comparison, making equivalent modifications of a bit/byte data carousel would be extremely difficult if not impossible for most users.

The transformation or conversion process preferably includes the following steps.

The object carousel root directory, file, directory and other object declarations are mapped directly into the data carousel document, since the declaration format is identical for object and data carousels.

The object carousel contains a sequence that lists the files, directories and other objects that are to appear in the carousel. A list of modules is defined by working sequentially through the object carousel sequence. A module is "packed" with each object in order up to the point where adding another object would make the cumulative value of the object sizes exceed the module size limit defined in the DSM-CC specification or other standards for broadcast systems as appropriate. A new module is then created until the sequence is fully completed. This algorithm makes a simple fit that can be further optimised by hand later.

A message sequence is defined with the DSI and DII messages at the beginning referring to the modules in a simple linear sequence.

As the module declarations contain objects in the order described in the object carousel sequence, a message sequence is defined where each module is simply listed in order.

The transformation algorithm is representative of methods used by DSM-CC carousel servers to generate a transport stream. The object to data carousel mechanism allows a user to fine-tune the resulting data carousel before generation of a transport stream to ensure better performance based on the rough hints from the transformed object carousel. The object-data carousel transformation mechanism also allows algorithm designers to create alternative mappings to form the basis of later hand optimisation. As a tool, the translation mechanism provides an effort saving measure that can yield considerable benefits.

In order to allow a predetermined conversion algorithm to be used, the formats of the XML representations for the object and data carousels are predetermined. This may be achieved by appropriate respective XML schemas.

The following is an example of the XML schema for the object carousel representation.

```
-<xsd:schema xmlns:xsd="http://www.w3.org/2001/XMLSchema">
-<xsd:annotation>
<xsd:documentation>Carousel Configuration schema for Sony MediaCaster</xsd:documentation>
</xsd:annotation>
-<!-- elements -->
<xsd:element name="carousel" type="carouselType" />
<xsd:element name="root" type="directoryType" />
<xsd:element name="directory" type="directoryType" />
<xsd:element name="file" type="fileType" />
<xsd:element name="cycle" type="cycleType" />
<xsd:element name="instance" type="instanceType" />
<xsd:element name="stream" type="streamType" />
<xsd:element name="streamEvent" type="streamEventType" />
<xsd:element name="objectSequence" type="objectSequenceType" />
<xsd:element name="objectRef" type="objectRefType" />
<xsd:element name="comment" type="xsd:string" />
-<!-- types -->
-<xsd:complexType name="carouselType">
-<xsd:sequence>
<xsd:element ref="comment" minOccurs="0" />
<xsd:element ref="root" />
<xsd:element ref="objectSequence" />
</xsd:sequence>
</xsd:complexType>
-<!-- -->
-<xsd:complexType name="objectSequenceType">
-<xsd:sequence>
<xsd:element ref="comment" minOccurs="0" />
<xsd:element ref="objectRef" minOccurs="0" maxOccurs="unbounded" />
</xsd:sequence>
</xsd:complexType>
-<!-- -->
-<xsd:complexType name="directoryType">
-<xsd:sequence>
<xsd:element ref="comment" minOccurs="0" />
-<xsd:choice minOccurs="0" maxOccurs="unbounded">
<xsd:element ref="file" />
<xsd:element ref="cycle" />
<xsd:element ref="directory" />
</xsd:choice>
</xsd:sequence>
<xsd:attribute name="name" type="xsd:string" use="required" />
</xsd:complexType>
-<!-- -->
-<xsd:complexType name="fileType">
-<xsd:sequence>
<xsd:element ref="comment" minOccurs="0" />
</xsd:sequence>
<xsd:attribute name="name" type="xsd:string" use="required" />
<xsd:attribute name="content" type="xsd:string" use="required" />
<xsd:attribute name="immediate" type="xsd:boolean" use="required" />
<xsd:attribute name="contentType" type="xsd:string" />
</xsd:complexType>
-<!-- -->
-<xsd:complexType name="cycleType">
-<xsd:sequence>
<xsd:element ref="comment" minOccurs="0" />
<xsd:element ref="instance" maxOccurs="unbounded" />
</xsd:sequence>
<xsd:attribute name="name" type="xsd:string" use="required" />
</xsd:complexType>
-<!-- -->
-<xsd:complexType name="instanceType">
-<xsd:sequence>
<xsd:element ref="comment" minOccurs="0" />
</xsd:sequence>
<xsd:attribute name="content" type="xsd:string" use="required" />
<xsd:attribute name="contentType" type="xsd:string" />
</xsd:complexType>
-<!-- -->
-<xsd:complexType name="streamType" abstract="true">
```

```
-<xsd:sequence>
<xsd:element ref="comment" minOccurs="0" />
</xsd:sequence>
<xsd:attribute    name="name"    type="xsd:string"
    use="required" />
</xsd:complexType>
-<!-- -->
<xsd:complexType         name="streamEventType"
    abstract="true">
-<xsd:sequence>
<xsd:element ref="comment" minOccurs="0" />
</xsd:sequence>
<xsd:attribute    name="name"    type="xsd:string"
    use="required" />
</xsd:complexType>
-<!-- -->
-<xsd:complexType name="objectRefType">
<xsd:sequence />
<xsd:attribute    name="path"    type="xsd:string"
    use="required" />
</xsd:complexType>
</xsd:schema>
```

As exemplified above, a preferred schema allows concise declaration of the hierarchical structure of files, directories and other objects in an object carousel, together with hints about the order in which they should appear in a data carousel.

An example of an appropriate XML schema for the data carousel representation is given below.

```
-<xsd:schema    xmlns:xsd="http://www.w3.org/2001/
    XMLSchema">
-<xsd:annotation>
<xsd:documentation>Carousel Configuration schema for
    Sony MediaCaster</xsd:documentation>
</xsd:annotation>
-<!-- elements -->
<xsd:element name="carousel" type="carouselType" />
<xsd:element name="root" type="directoryType" />
<xsd:element name="directory" type="directoryType" />
<xsd:element name="file" type="fileType" />
<xsd:element name="cycle" type="cycleType" />
<xsd:element name="instance" type="instanceType" />
<xsd:element name="stream" type="streamType" />
<xsd:element            name="streamEvent"
    type="streamEventType" />
<xsd:element            name="programStreamInfo"
    type="programStreamInfoType" />
<xsd:element            name="eventStreamInfo"
    type="eventStreamInfoType" />
<xsd:element name="event" type="eventType" />
<xsd:element name="module" type="moduleType" />
<xsd:element  name="objectRef"  type="objectRefType"
    />
>xsd:element            name="binaryContent"
    type="binaryContentType" />
<xsd:element name="DII" type="DIIType" />
<xsd:element            name="moduleInfo"
    type="moduleInfoType" />
<xsd:element name="tapList" type="tapListType" />
<xsd:element            name="privateData"
    type="privateDataType" />
<xsd:element            name="objectUseTap"
    type="objectUseTapType" />
<xsd:element name="tap" type="tapType" />
<xsd:element name="userInfo" type="userInfoType" />
<xsd:element            name="labelDescriptor"
    type="labelDescriptorType" />
<xsd:element name="cachingPriorityDescriptor"
    type="cachingPriorityDescriptorType" />
<xsd:element    name="descriptor"    type=
    "descriptorType" />
<xsd:element name="DSI" type="DSIType" />
<xsd:element           name="messageSequence"
    type="messageSequenceType" />
<xsd:element            name="messageRef"
    type="messageRefType" />
<xsd:element            name="elementaryStream"
    type="elementaryStreamType" />
<xsd:element name="comment" type="xsd:string" />
<!-- types -->
-<xsd:complexType name="carouselType">
-<xsd:sequence>
<xsd:element ref="comment" minOccurs="0" />
<xsd:element ref="root" />
<xsd:element ref="module" maxOccurs="unbounded" />
<xsd:element ref="DII" maxOccurs="unbounded" />
<xsd:element ref="DSI" />
<xsd:element ref="messageSequence" />
<xsd:element ref="elementaryStream" />
</xsd:sequence>
</xsd:complexType>
-<!-- -->
-<xsd:complexType name="directoryType">
-<xsd:sequence>
<xsd:element ref="comment" minOccurs="0" />
-<xsd:choice minOccurs="0" maxOccurs="unbounded">
<xsd:element ref="file" />
<xsd:element ref="cycle" />
<xsd:element ref="directory" />
<xsd:element ref="stream" />
<xsd:element ref="streamEvent" />
</xsd:choice>
</xsd:sequence>
<xsd:attribute    name="name"    type="xsd:string"
    use="required" />
</xsd:complexType>
-<!-- -->
-<xsd:complexType name="fileType">
-<xsd:sequence>
<xsd:element ref="comment" minOccurs="0" />
</xsd:sequence>
<xsd:attribute    name="name"    type="xsd:string"
    use="required" />
<xsd:attribute    name="content"    type="xsd:string"
    use="required" />
<xsd:attribute  name="immediate"  type="xsd:boolean"
    use="required" />
<xsd:attribute name="contentType" type="xsd:string" />
</xsd:complexType>
-<!-- -->
<xsd:complexType name="cycleType">
-<xsd:sequence>
<xsd:element ref="comment" minOccurs="0" />
<xsd:element ref="instance" maxOccurs="unbounded" />
</xsd:sequence>
<xsd:attribute    name="name"    type="xsd:string"
    use="required" />
</xsd:complexType>
-<!-- -->
-<xsd:complexType name="instanceType">
-<xsd:sequence>
<xsd:element ref="comment" minOccurs="0" />
</xsd:sequence>
<xsd:attribute    name="content"    type="xsd:string"
    use="required" />
```

```
<xsd:attribute name="contentType" type="xsd:string" />
</xsd:complexType>
-<!-- -->
-<xsd:complexType name="streamType">
-<xsd:sequence>
<xsd:element ref="comment" minOccurs="0" />
<xsd:element ref="programStreamInfo" />
</xsd:sequence>
<xsd:attribute name="name" type="xsd:string" use="required" />
</xsd:complexType>
-<!-- -->
-<xsd:complexType name="streamEventType">
-<xsd:sequence>
<xsd:element ref="comment" minOccurs="0" />
<xsd:element ref="event" maxOccurs="unbounded" />
<xsd:element ref="eventStreamInfo" />
<xsd:element ref="programStreamInfo" />
</xsd:sequence>
<xsd:attribute name="name" type="xsd:string" use="required" />
</xsd:complexType>
-<!-- -->
-<xsd:complexType name="programStreamInfoType">
<xsd:sequence />
<xsd:attribute name="audio" type="xsd:boolean" use="required" />
<xsd:attribute name="video" type="xsd:boolean" use="required" />
<xsd:attribute name="data" type="xsd:boolean" use="required" />
<xsd:attribute name="description" type="xsd:string" use="required" />
<xsd:attribute name="durationSeconds" type="xsd:integer" use="required" />
<xsd:attribute name="durationMicroSeconds" type="xsd:integer" use="required" />
<xsd:attribute name="transportStreamID" type="xsd:integer" use="required" />
<xsd:attribute name="programNumber" type="xsd:integer" use="required" />
<xsd:attribute name="networkID" type="xsd:integer" use="required" />
<xsd:attribute name="PMTTag" type="xsd:integer" use="required" />
</xsd:complexType>
-<!-- -->
-<xsd:complexType name="eventStreamInfoType">
<xsd:sequence />
<xsd:attribute name="pid" type="xsd:integer" use="required" />
<xsd:attribute name="bitrate" type="xsd:integer" use="required" />
</xsd:complexType>
-<!-- -->
-<xsd:complexType name="eventType">
<xsd:sequence />
<xsd:attribute name="name" type="xsd:string" use="required" />
<xsd:attribute name="id" type="xsd:integer" use="required" />
</xsd:complexType>
-<!-- -->
-<xsd:complexType name="moduleType">
-<xsd:sequence>
<xsd:element ref="comment" minOccurs="0" />
-<xsd:choice>
<xsd:element ref="objectRef" minOccurs="0" maxOccurs="unbounded" />
<xsd:element ref="binaryContent" />
</xsd:choice>
</xsd:sequence>
<xsd:attribute name="name" type="xsd:string" use="required" />
</xsd:complexType>
-<!-- -->
-<xsd:complexType name="objectRefType">
<xsd:sequence />
<xsd:attribute name="path" type="xsd:string" use="required" />
</xsd:complexType>
-<!-- -->
<xsd:complexType name="binaryContentType">
<xsd:sequence />
<xsd:attribute name="path" type="xsd:string" use="required" />
</xsd:complexType>
-<!-- -->
-<xsd:complexType name="DIIType">
-<xsd:sequence>
<xsd:element ref="moduleInfo" minOccurs="0" maxOccurs="unbounded" />
<xsd:element ref="privateData" minOccurs="0" maxOccurs="unbounded" />
</xsd:sequence>
<xsd:attribute name="name" type="xsd:string" use="required" />
<xsd:attribute name="transactionID" type="xsd:hexBinary" />
<xsd:attribute name="downloadID" type="xsd:integer" />
/xsd:complexType>
-<!-- -->
-<xsd:complexType name="moduleInfoType">
-<xsd:sequence>
<xsd:element ref="tapList" />
<xsd:element ref="userInfo" />
</xsd:sequence>
<xsd:attribute name="moduleRef" type="xsd:string" use="required" />
<xsd:attribute name="moduleTimeOut" type="xsd:hexBinary" />
<xsd:attribute name="blockTimeOut" type="xsd:hexBinary" />
<xsd:attribute name="minBlockTime" type="xsd:hexBinary" />
</xsd:complexType>
-<!-- -->
-<xsd:complexType name="tapListType">
-<xsd:sequence>
<xsd:element ref="objectUseTap" />
<xsd:element ref="tap" minOccurs="0" maxOccurs="unbounded" />
</xsd:sequence>
</xsd:complexType>
-<!-- -->
-<xsd:complexType name="objectUseTapType">
<xsd:sequence />
<xsd:attribute name="tag" type="xsd:integer" />
</xsd:complexType>
-<!-- -->
-<xsd:complexType name="tapType">
<xsd:sequence />
<xsd:attribute name="id" type="xsd:integer" />
```

```
<xsd:attribute name="use" type="xsd:integer" />
<xsd:attribute name="tag" type="xsd:integer" />
</xsd:complexType>
-<!-- -->
-<xsd:complexType name="userInfoType">
-<xsd:sequence>
<xsd:element name="compressedModuleDescriptor" />
<xsd:element ref="labelDescriptor" />
<xsd:element ref="cachingPriorityDescriptor" />
<xsd:element     ref-"descriptor"     maxOccurs=
    "unbounded" />
</xsd:sequence>
</xsd:complexType>
-<!-- -->
-<xsd:complexType name="labelDescriptorType">
<xsd:sequence/>
<xsd:attribute name="label" type="xsd:string" />
</xsd:complexType>
-<!-- -->
-<xsd:complexType
    name="cachingPriorityDescriptorType">
<xsd:sequence/>
<xsd:attribute name="priorityValue" type-"xsd:byte" />
<xsd:attribute name="transparencyLevel" type="xsd:
    byte" />
</xsd:complexType>
-<!-- -->
-<xsd:complexType name="descriptorType">
<xsd:sequence />
<xsd:attribute name="tag" type="xsd:byte" />
</xsd:complexType>
-<!-- -->
-<xsd:complexType name="privateDataType">
<xsd:sequence />
</xsd:complexType>
-<!-- -->
-<xsd:complexType name="DSIType">
-<xsd:sequence>
<xsd:element ref="comment" minOccurs="0" />
</xsd:sequence>
<xsd:attribute    name="name"    type="xsd:string"
    use="required" />
</xsd:complexType>
-<!-- -->
-<xsd:complexType name="messageSequenceType">
-<xsd:sequence>
<xsd:element ref="comment" minOccurs="0" />
<xsd:element    ref="messageRef"    minOccurs="0"
    maxOccurs="unbounded" />
</xsd:sequence>
</xsd:complexType>
-<!-- -->
-<xsd:complexType name="messageRefType">
<xsd:sequence />
<xsd:attribute    name="name"    type="xsd:string"
    use="required" />
</xsd:complexType>
-<!-- -->
-<xsd:complexType name="elementaryStreamType">
-<xsd:sequence>
<xsd:element ref="comment" minOccurs="0" />
</xsd:sequence>
<xsd:attribute    name="name"    type="xsd:string"
    use="required" />
</xsd:complexType>
-<!-- -->
</xsd:schema>
```

As exemplified above, a preferred schema provides a readable description of the detailed structure of a data carousel. It specifies the grouping of objects into modules, the parameters associated with modules and the order and relative frequency of DSI, DII and DDB sections in the output stream. These are all factors that can affect the performance of the broadcast at the receiving equipment and it is desirable to allow easy experimentation with these parameters in order to maximise performance.

It will, of course, be evident that other schemas could also be constructed, though, then, of course, the conversion between the XML representations would be different.

Conversion may be achieved with any appropriate algorithm defined using any desired language, such as C++.

Figure 7:
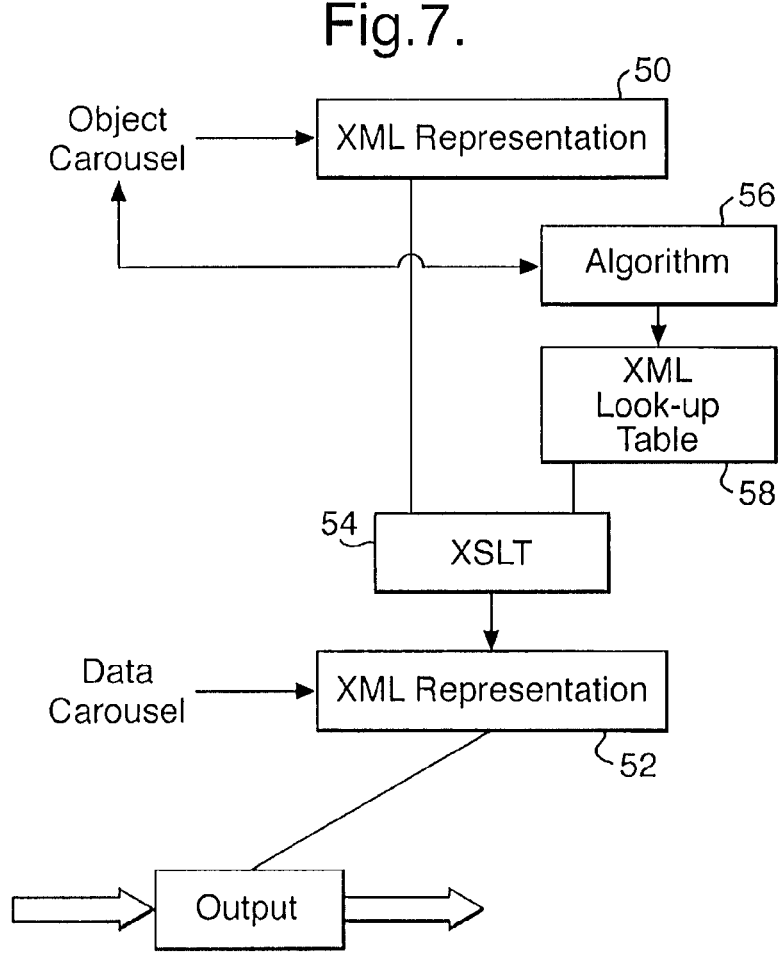
FIG. 7 illustrates schematically conversion from object to data carousels.

FIG. 7 illustrates schematically a conversion process using an XSLT algorithm 54. XSLT stands for Extensible Stylesheet Language Transformation and is a language and processor that allows relatively easy development of transformations between different formats of XML. It is particularly well suited to converting XML, because the language has built-in features for interpreting and transforming XML. However, the XSLT algorithm needs to know the sizes of the files of the object carousel in order to create the appropriate data carousel XML representation. The XSLT algorithm itself is unable to determine the sizes. Therefore, an additional algorithm 56 is provided to analyse the object carousel so as to determine the size of files and provide this information as an XML look-up table 58. Thus, the XSLT conversion algorithm analyses the XML representation of the object carousel and uses information regarding file size from the XML look-up table to create the XML representation of the data carousel.

The stylesheet implements a simple module packing algorithm to transform an XML object carousel structure into a detailed XML data carousel structure. Implementation in XSLT allows convenient interpretation of the incoming XML structure and also allows flexibility about where in the system the algorithm is executed.

In addition, more sophisticated techniques for creating data carousel structures would be relatively easy to incorporate and the implementation would be easily adaptable to accommodate future changes to the object carousel and data carousel XML schemas.

The look-up table algorithm for object carousel file sizes may be implemented as a UNIX shell script. An example is given below.

```
#!/bin/sh

# Given an object carousel XML description on stdin,
    generate a list of
# Pathnames used by the carousel and the sizes of the
    corresponding
# files. The list is in XML and appears on stdout.

# usage: generateFileSizes carouselDir

# check args
if [$#!=1]; then
    echo "usage: generateFileSizes carouselDir"1>&2
    exit 1
fi
# temporary file
TMPFILE=generateFileSizes.$$
# where are the carousel files?
CAROUSELDIR="$1"
# separate elements that are on the same line
```

```
# NOTE it seems to be necessary to go via a temporary
    file . . .
# a pipe doesn't seem to work
sed -e's/>/>\g'>$TMPFILE
# isolate the content files that appear in the carousel
FILES='cat   $TMPFILE|sed   -n   -e's/^.*content=\"\
    ([^"]*\)\".*$\1/p"
# output an element listing the files and their sizes
echo "<files>"
for i in $FILES; do
# get the size of a file
SIZE='ls -l $CAROUSELDIR/$i|awk'{print $5}'"
# output an element
echo "<file path=\"$i\"size=\"$SIZE\"/>"
done
echo "</files>"
rm $TMPFILE
```

This script generates an XML look-up table that maps file names used by an object carousel to the sizes of the files. References to files are extracted from an XML object carousel description and each file is examined in turn to produce a list of XML elements, each containing the name of a file and its size in bytes.

The following is an example of a look-up table:
```
<files>
<file path="diddle.txt" size="168"/>
<file path="dingdong.txt" size="269"/>
<file path="kxmrain.txt" size="423"/>
<file path="raining.txt" size="212"/>
<file path="Jack/jack.txt" size="72"/>
<file path="Jack/jacksprat.txt" size="124"/>
<file path="Jack/jackjill.txt" size="259"/>
<file path="More/sheep.txt" size="167"/>
<file path="More/owl.txt" size="1205"/>
<file path="More/Other/dance.txt" size="194"/>
<file path="More/Other/goosey.txt" size="223"/>
<file path="More/Other/hush.txt" size="616"/>
<file path="More/Other/kookaburra.txt" size="299"/>
<file path="More/Other/mulberry.txt" size="1409"/>
<file path="More/Other/unicom.txt" size="222"/>
<file path="More/Other/georgie.txt" size="128"/>
<file path="More/Other/hickory.txt" size="125"/>
<file path="More/Other/knickknack.txt" size="2032"/>
<file path="More/Other/ladybird.txt" size="189"/>
<file path="More/Other/spider.txt" size="210"/>
</files>
```

Finally, it should be appreciated that the present invention is not constrained to television systems but could be applied to any data broadcast system, based, for instance, on MPEG streams, such as DAB (Digital Audio Broadcasting) digital radio or custom broadcast applications.

We claim:

1. A method of creating, from respective DSM-CC (Digital Storage Media Command and Control) type object carousels, DSM-CC type data carousels stored on a computer readable storage medium for broadcast to a plurality of end users, the method including, before broadcast:
  creating, via a user controllable GUI, a first representation of a DSM-CC type object carousel in a structured data format from the DSM-CC type object carousel using a first data format definition stored in a first memory that represents in the structured data format, the DSM-CC type object carousel, wherein the structured data format is XML;
  analyzing the first representation to determine compatibility with predetermined criteria;
  converting the entire first representation, which is in the structured data format, to a second representation of a DSM-CC type data carousel in the same structured data format using a second data format definition stored in a second memory that represents, in the structured data format, the DSM-CC type data carousel, in response to the step of analyzing and determining that the first representation is compatible with the predetermined criteria; and
  converting, before broadcast to an Integrated Receiver Decoder, the second representation to the DSM-CC type data carousel to be presented to the plurality of end users through the Integrated Receiver Decoder and storing the result on the computer readable storage medium, wherein said DSM-CC type object carousel is descriptive of a data file structure and is organized in a hierarchical structure and said DSM-CC type data carousel is organized in a non-hierarchical module based structure.

2. The method according to claim 1 wherein the predetermined criteria includes criteria relating to DSM-CC and broadcast systems.

3. The method according to claim 1 further including:
  editing the second representation before converting the second representation to the DSM-CC type of the data carousel to optimize an arrangement of data in DSM-CC type the data carousel.

4. The method according to claim 1 wherein the steps of analyzing and converting the first representation to the second representation are conducted as part of a predefined XSLT algorithm.

5. The method according to claim 4 wherein the step of analyzing further includes determining sizes of files of the DSM-CC type object carousel and providing in a structured data format the sizes as a look-up table, whereby the XSLT algorithm uses the look up table in the steps of analyzing and converting the first representation to the second representation.

6. The method according to claim 1, wherein output data of the DSM-CC type data carousel is a non-structured data format.

7. The method according to claim 1, wherein output data of the DSM-CC type data carousel is a transport stream.

8. The method according to claim 7, wherein the transport stream is an MPEG transport stream.

9. The method according to claim 1, wherein the entire first representation is converted to the second representation using a look up table.

10. An apparatus for creating, from respective DSM-CC (Digital Storage Media Command and Control) type object carousels, DSM-CC type data carousels for broadcasting to a plurality of end users, the apparatus including:
  a first memory containing a first data format definition configured to represent, in a structured data format, wherein the structured data format is XML, a plurality of DSM-CC type object carousels, wherein said respective DSM-CC type object carousels are a subset of said plurality of DSM-CC type object carousels;
  a second memory containing a second data format definition configured to represent, in the structured data format, a plurality of DSM-CC type data carousels, said DSM-CC type data carousels being a subset of said plurality of data carousels, the structured data format of the second data format definition being the same as the structured data format of the first data format definition;
  a GUI configured to be controlled by a user to generate, from one of the respective DSM-CC type object carousels, a first representation of said one of the respective DSM-CC type object carousels in the structured data format;

a processor configured to analyze the first representation to determine compatibility with a predetermined criteria and configured to convert the entire first representation, which is in the structured data format, to a second representation of a DSM-CC type data carousel in the same structured data format in response to compatibility being determined; and an output processor configured to convert, before broadcast to an Integrated Receiver Decoder, the second representation of the DSM-CC type data carousel to the DSM-CC type data carousel to be broadcast to the plurality of end users via the Integrated Receiver Decoder, wherein each of said DSM-CC type object carousels is descriptive of a respective data file structure and is organized in a hierarchical structure and said DSM-CC type data carousel is organized in a non-hierarchical module based structure.

11. The apparatus according to claim 10, wherein the predetermined criteria includes criteria relating to DSM-CC and broadcast systems.

12. The apparatus according to claim 10, wherein the GUI is further configured to be controlled by the user to edit the second representation to optimize an arrangement of data as part of the DSM-CC type data carousel.

13. The apparatus according to claim 10 wherein the processor analyzes an XML representation of the one of the respective DSM-CC type object carousels and converts the XML representation of the DSM-CC type object carousel to an XML representation of the DSM-CC type data carousel using a predefined XSLT algorithm.

14. The apparatus according to claim 13 wherein the processor determines sizes of files of the DSM-CC type object carousel and provides in XML the sizes as a look-up table whereby the XSLT algorithm uses the look-up table.

15. A computer readable storage medium having recorded thereon code components that, when loaded on a computer and executed by the computer, performs a method of creating, from respective DSM-CC (Digital Storage Media Command and Control) type object carousels, DSM-CC type data carousels for broadcast to a plurality of end users, the method including, before broadcast:

creating, via a user controllable GUI, a first representation of a DSM-CC type object carousel in a structured data format from the DSM-CC type object carousel using a first data format definition stored in a first memory that represents in the structured data format, the DSM-CC type object carousel, wherein the structured data format is XML;

analyzing the first representation to determine compatibility with predetermined criteria;

converting the entire first representation, which is in the structured data format, to a second representation of a DSM-CC type data carousel in the same structured data format using a second data format definition stored in a second memory that represents, in the structured data format, the DSM-CC type data carousel, in response to the step of analyzing and determining that the first representation is compatible with the predetermined criteria; and converting, before broadcast to an Integrated Receiver Decoder, the second representation to the DSM-CC type data carousel to be presented to the plurality of end users through the Integrated Receiver Decoder, wherein said DSM-CC type object carousel is descriptive of a data file structure and is organized in a hierarchical structure and said DSM-CC type data carousel is organized in a non-hierarchical module based structure.

16. A method of creating, from respective DSM-CC (Digital Storage Media Command and Control) type object carousels, DSM-CC type data carousels stored on a computer readable storage medium for broadcast to a plurality of end users, the method including, before broadcast:

creating, via a user controllable GUI, a first representation of a DSM-CC type object carousel in a structured data format from the DSM-CC type object carousel using a first data format definition stored in a first memory that represents in the structured data format, the DSM-CC type object carousel, wherein the structured data format is XML;

analyzing the first representation to determine compatibility with predetermined criteria;

converting the entire first representation, which is in the structured data format, to a second representation of a DSM-CC type data carousel in the same structured data format using a second data format definition stored in a second memory that represents, in the structured data format, the DSM-CC type data carousel and a look-up table, in response to the step of analyzing and determining that the first representation is compatible with the predetermined criteria; and converting, before broadcast to an Integrated Receiver Decoder, the second representation to the DSM-CC type data carousel to be presented to the plurality of end users through the Integrated Receiver Decoder and storing the result on the computer readable storage medium, wherein said DSM-CC type object carousel is descriptive of a data file structure and is organized in a hierarchical structure and said DSM-CC type data carousel is organized in a non-hierarchical module based structure.

* * * * *